US006544680B1

(12) United States Patent
Takano et al.

(10) Patent No.: US 6,544,680 B1
(45) Date of Patent: Apr. 8, 2003

(54) FUEL CELL SEPARATOR, A FUEL CELL USING THE FUEL CELL SEPARATOR, AND A METHOD FOR MAKING THE FUEL CELL SEPARATOR

(75) Inventors: Shigeru Takano, Chiba (JP); Kenichi Uehara, Chiba (JP); Yasunobu Iizuka, Tokyo (JP); Hitomi Hatano, Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/591,169

(22) Filed: Jun. 9, 2000

(30) Foreign Application Priority Data

| | | |
|---|---|---|
| Jun. 14, 1999 | (JP) | 11-166918 |
| Jun. 30, 1999 | (JP) | 11-186825 |
| Dec. 3, 1999 | (JP) | 11-345269 |
| Dec. 17, 1999 | (JP) | 11-359474 |

(51) Int. Cl.$^7$ .................... H01M 2/00
(52) U.S. Cl. .................... 429/34; 429/38; 429/39
(58) Field of Search .................... 429/34, 38, 39

(56) References Cited

FOREIGN PATENT DOCUMENTS

| | | |
|---|---|---|
| JP | 62-260709 | * 11/1987 |
| JP | 62-270412 | * 11/1987 |
| JP | 62-272465 | * 11/1987 |
| JP | 5-166513 | * 7/1993 |

* cited by examiner

*Primary Examiner*—Laura Weiner
(74) *Attorney, Agent, or Firm*—Piper Rudnick LLP

(57) ABSTRACT

A fuel cell separator including (a) about 100 parts by weight of graphitized meso-carbon microbeads, (b) about 10 to 35 parts by weight of one of a thermosetting resin and a thermoplastic resin, and (c) about 1 to 40 parts by weight of at least one carbonaceous material selected from the group consisting of graphite powder, carbon black, and fine carbon fibers. The fuel cell separator exhibits low electrical resistivity, low volume resistivity, superior gas impermeability, and superior dimensional accuracy without a graphitizing treatment after molding. A fuel cell using the fuel cell separators can be produced while saving energy using a simplified facility and has superior generation efficiency.

19 Claims, 2 Drawing Sheets

FUEL CELL SEPARATOR, A FUEL CELL USING THE FUEL CELL SEPARATOR, AND A METHOD FOR MAKING THE FUEL CELL SEPARATOR

BACKGROUND OF THE INVENTION

1. Field of the Invention

This invention relates to fuel cell separators, to methods for making the same, and to fuel cells using the separators. In particular, the invention relates to a fuel cell separator having a low electrical resistance in its thickness direction and a highly accurate size, to a method for making the fuel cell separator, and to a fuel cell having a high generation efficiency using the fuel cell separator.

2. Description of the Related Art

Fuel cells having high generation efficiency and producing fewer contaminants are anticipated as future power plants. Fuel cells are classified as: the alkaline type, the phosphate type, the melted carbonate type, the solid electrolyte type, and the solid polymer type depending on the type of electrolyte used. The solid polymer electrolyte type can generate electric power at a low operational temperature and has attracted attention as a small-scale power plant for domestic use or as a portable power plant for electric cars.

As shown in a perspective view in FIG. 1, a solid polymer-type fuel cell includes a unit cell of a solid polymer electrolyte 1, an air electrode 2 and a fuel electrode 3 provided on a front face and a back face, respectively, of the solid polymer electrolyte 1. A plurality of unit cells is stacked with separators 4 having grooves 5 as gas channels. A perfluorocarbon sulfonic acid ion-exchange film is typically used as the solid polymer electrolyte. The separator 4 functions as a boundary for isolating a fuel gas from an oxidizing gas and acts as an electrical conductor between the unit cells. This requires high gas impermeability, high thermal conductivity, high mechanical strength, low electrical resistivity, low volume resistivity, and heat resistance at operation temperatures.

Such separators have been made by mechanically working artificial graphite or metallic materials, such as titanium or stainless steel. The artificial graphite separator is disadvantageous in that there is insufficient gas impermeability and it is relatively expensive, although it does have high electrical conductivity. The metallic separator is also expensive and oxidized during operation over long periods.

To solve the above problems, Japanese Unexamined Patent Application Publication Nos. 10-334927 and 11-297337 disclose separators for solid polymer-type fuel cells which are formed of compounds of artificial graphite powder and thermosetting resins and exhibit improved gas impermeability and suppressed oxidation. These separators, however, exhibit poor dimensional accuracy in the thickness direction due to orientation of particles in the planar direction. Thus, separators having high dimensional accuracy in the thickness direction cannot be stably produced. As shown in FIG. 1, each separator 4 has grooves 5 for supplying a fuel gas, such as hydrogen, and an oxidizing gas, such as air, on both faces. When the depth of the grooves 5 as gas channels is uneven, each groove has a different ventilation resistance. As a result, the fuel cell has a gas flow rate distribution which inhibits high generating efficiency.

Other important properties required for the fuel cell separator are low electrical resistivity and low volume resistivity. Japanese Unexamined Patent Application Publication No. 62-260709 discloses a separator for a phosphate-type fuel cell which is composed of graphitized meso-carbon microbeads as an aggregate and a thermosetting resin as a binder. Although this separator uses close packing of meso-carbon microbeads, conductivity is insufficient due to electrical conduction only at point contacts.

Japanese Unexamined Patent Application Publication No. 4-214072 discloses a fuel cell separator formed by hardening and firing a compound composed of carbonaceous powder, such as graphitized meso-carbon microbeads or graphite powder, and a phenol resin. This separator contains 100 parts by weight of phenol resin with respect to 50 to 150 parts by weight of carbonaceous powder. Since this separator contains such a large amount of insulating resinous component, sufficient conductivity is achieved after the hardening reaction. In order to yield high conductivity, the hardened compound is then fired to graphitize the carbonaceous powder. Graphitizing is generally performed at 2,000 to 3,000° C. in a nonoxidizing atmosphere. Thus, industrial production of the separator by graphitizing the molded compound has problems in view of facilities, operation, and energy.

OBJECTS OF THE INVENTION

It is an object of the invention to provide a fuel cell separator having high gas impermeability, low electrical resistivity, low volume resistivity, and high dimensional accuracy, and to provide a fuel cell having high generation efficiency.

It is another object of the invention to provide a fuel cell separator having the above advantages without graphitizing the molded separator article and a fuel cell.

It is another object of the invention to provide a method for making the fuel cell separator.

SUMMARY OF THE INVENTION

According to an aspect of the invention, a fuel cell separator comprises (a) about 100 parts by weight of graphitized meso-carbon microbeads, (b) about 10 to 35 parts by weight of one of a thermosetting resin and a thermoplastic resin, and (c) about 1 to 40 parts by weight of at least one carbonaceous material selected from the group consisting of graphite powder, carbon black, and fine carbon fiber.

Preferably, the fine carbon fiber has an average diameter of not more than about 2 μm and an average length of not more than about 500 μm. Preferably, the graphitized meso-carbon microbeads have an average diameter of not more than about 50 μm, the graphite powder has an average diameter of not more than about 10 μm, and the carbon black has an average diameter of not more than about 100 nm.

The fuel cell separator is suitably used in a solid polymer-type fuel cell.

According to yet another aspect, a fuel cell includes the above fuel cell separator.

According to yet another aspect, a method for making a fuel cell separator includes mixing (a) about 100 parts by weight of graphitized meso-carbon microbeads, (b) about 10 to 35 parts by weight of one of a thermosetting resin and a thermoplastic resin, and (c) about 1 to 40 parts by weight of at least one carbonaceous material selected from the group consisting of graphite powder, carbon black, and fine carbon fiber, and molding the mixture under pressure at an elevated temperature.

DESCRIPTION OF THE PREFERRED EMBODIMENTS

Figure 1:
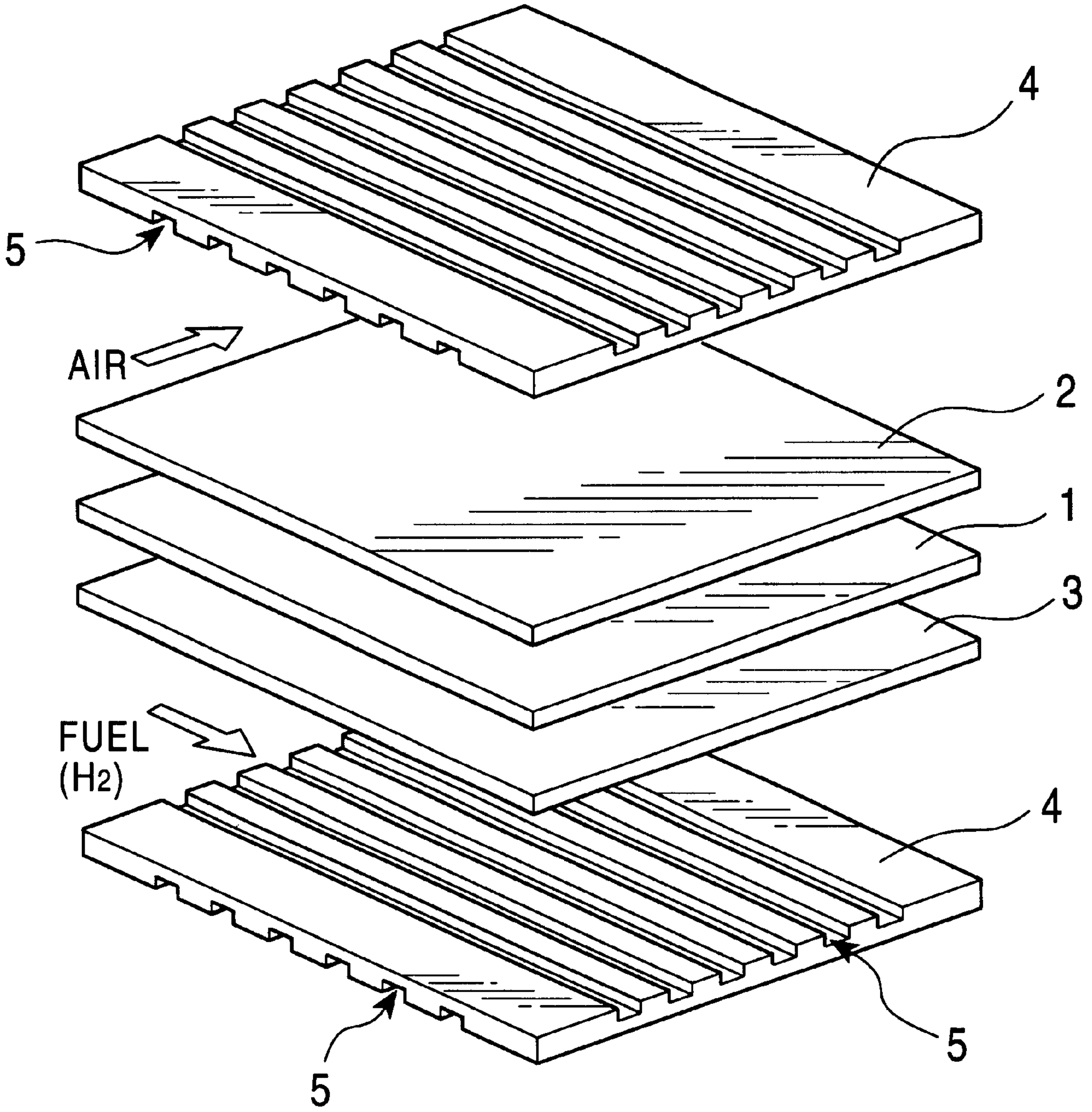
FIG. 1 is a perspective view showing a solid polymer-type fuel cell.

The present invention will now be described in detail. It will be appreciated that the following description is intended to refer to specific embodiments of the invention selected for illustration in the drawings and is not intended to define or limit the invention other than in the appended claims.

The inventors have discovered the following important points which significantly contribute to this invention.

(1) Improved dimensional accuracy of fuel cell separator by graphitized meso-carbon microbeads.

Use of graphitized meso-carbon microbeads as a material for a fuel cell separator improves the dimensional accuracy of the fuel cell separator. The graphitized meso-carbon microbeads have a substantially spherical shape and a diameter of several to several tens of μm, and they exhibit high flowability in a molding process for the fuel cell separator compared to conventional artificial graphite flakes. The resulting molded article has an isotropic structure.

(2) Improved conductivity of fuel cell separator by controlling resin content and by using fine carbon powder and fine carbon fiber.

A goal of the inventors was to provide a fuel cell separator having sufficient conductivity (specific resistance and low volume resistivity) by only using a molding process without graphitizing the molded article for the fuel cell separator. An attempt was made to use at least one carbonaceous material selected from the group consisting of graphite powder, carbon black, and fine carbon fibers and to suppress the resin content in the compound, and a composition for improving the conductivity of the fuel cell separator without graphitizing the molded article for the fuel cell separator was discovered.

Although we do not intend to be bound by any particular theory, the technical concept of the invention is believed to work as follows: An electric channel is formed by point contacts between the graphitized meso-carbon microbeads. In addition, gaps between particles and noncontact points are filled with fine carbonaceous materials, such as graphite powder, carbon black, and fine carbon fiber to ensure high conductivity and control the content of resin being used as an insulator. The resin content is sufficient to ensure satisfactory strength and high gas impermeability of the fuel cell separator. By a combination of selected materials and a particular composition in the invention, an inexpensive fuel cell separator is obtainable without graphitizing the molded article for the fuel cell separator.

Meso-carbon microbeads used in the present invention are obtained as follows. Coal pitch or petroleum pitch is heat-treated to form optically anisotropic microbeads. Optically anisotropic microbeads are recovered as a filtration residue of the heat-treated pitch, by extraction from the heat-treated pitch with an organic solvent such as tar oil, or recovered by gravitational separation, such as precipitation.

In the invention, the meso-carbon microbeads are used after graphitization (hereinafter sometimes referred to as "graphitized meso-carbon microbeads"). The meso-carbon microbeads are preferably graphitized at a temperature of about 2,500° C. to 3,000° C.

The meso-carbon microbeads in the invention may also be a carbonaceous material formed at a temperature of approximately 600 to 1,000° C. Graphitized meso-carbon microbeads having high electrical conductivity. However, they are preferably used so that the separator has low electrical resistivity and low volume resistivity.

The graphitized meso-carbon microbeads have an average particle diameter in a range of preferably not more than about 50 μm, more preferably about 1 to 50 μm, and most preferably about 10 to 30 μm so that the resulting separator is dense and exhibits superior gas impermeability. When the average particle diameter exceeds about 50 μm, the graphitized meso-carbon microbeads may be used after pulverization.

In the invention, a thermosetting resin and/or a thermoplastic resin are used as a binder for the carbonaceous aggregate. These resins facilitate moldability of the fuel cell separator and improve conductivity of the separator. In particular, the resins facilitate production of a fuel cell separator having grooves with high dimensional accuracy. Using the thermoplastic resin, the fuel cell separator may be formed by injection molding with high productivity.

The fuel cell separator of the invention comprises (a) about 100 parts by weight of graphitized meso-carbon microbeads, (b) about 10 to 35 parts by weight of one of a thermosetting resin and a thermoplastic resin, and (c) about 1 to 40 parts by weight of at least one carbonaceous material selected from the group consisting of graphite powder, carbon black and fine carbon fibers.

When the resin content is about 10 parts by weight or more, voids barely form in the interior of the separator, and the resulting separator has superior gas impermeability. The upper limit of the resin content is about 35 parts by weight in the invention to ensure high conductivity, that is, specific resistance and low volume resistivity.

The type of thermoplastic resin used in the invention is not limited. The thermoplastic resin may be a crystalline thermoplastic resin having a melting point of preferably at least about 150° C. and more preferably at least about 200° C.; or may be an amorphous thermoplastic resin having a softening point of at least about 90° C. and more preferably at least about 150° C. These crystalline and amorphous thermoplastic resins may be used in combination. More preferably, the crystalline thermoplastic resin has a melting point of about 200 to 300° C., and the amorphous thermoplastic resin has a softening point of about 150 to 250° C.

Using these resins satisfying the above conditions, a fuel cell separator can be easily formed without deterioration of moldability and the resulting fuel cell separator has high thermal resistance.

Examples of preferable thermoplastic resins of the present invention include polypropylene, polystyrene, polyamides, polyesters, polycarbonates, polyphenylene sulfides, liquid crystal resins, and fluorinated resins. These thermoplastic resins may be used alone or in combination. Carbonaceous compositions formed using these resins have high thermal resistance and superior moldability. Moreover, fuel cell separators with grooves formed of the carbonaceous compositions have high thermal resistance and dimensional accuracy of the grooves.

The thermosetting resins used in the invention are not limited. Examples of preferable thermosetting resins include phenol resins, furan resins, epoxy resins, unsaturated polyester resins, and polyimide resins. These thermosetting resins may be used alone or in combination.

In the invention, phenol resins are more preferably used, because the resulting separator exhibits superior characteristics and the phenol resin is easily handled and is inexpensive.

As shown in FIG. 1, a fuel cell separator, particularly a separator for a solid polymer-type fuel cell, has grooves on both surfaces thereof in many cases. The width and the depth of each groove must be formed with high dimensional accuracy to achieve homogeneous reaction in the fuel cell.

In a conventional fuel cell separator using artificial graphite powder, the root-mean-square error of the depth of grooves formed on surfaces of the fuel cell separator cannot be reduced to a range of $\pm 5\times 10^{-2}$ mm, as described in the Examples below. The inventors herein hypothesized that such an error in the thickness is due to the shape of the artificial graphite powder. Since the artificial graphite powder is flaky, the powder is easily oriented in one direction. In contrast, in the separator including the graphitized meso-carbon microbeads of the invention, the aggregate particles are substantially spherical. Thus, the molding composition has high flowability and.the resulting molded article is substantially isotropic. As a result, the root-mean-square error of the depth of grooves formed on surfaces of the fuel cell separator can be reduced to a range of about $\pm 5\times 10^{-2}$ mm.

Since the fuel cell separator of the invention exhibits high dimensional accuracy, the separator is suitably used in a grooved separator requiring high dimensional accuracy, for example, a separator for a solid polymer-type fuel cell.

The fuel cell separator of the invention contains (c) about 1 to 40 parts by weight of at least one carbonaceous material selected from the group consisting of graphite powder, carbon black and fine carbon fibers. The addition of these materials causes significantly decreased specific resistance and volume resistivity. The addition of the carbonaceous materials causes improved conductivity, that is, significant decreases in specific resistance and volume resistivity. When the content does not exceed about 40 parts by weight, the carbonaceous materials are sufficiently dispersed so that the composition has high moldability. Moreover, the resulting fuel cell separator has high dimensional accuracy, that is, a root-mean-square error of the depth of grooves of about $\pm 5\times 10^{-2}$ mm. When the content exceeds about 40 parts by weight, dispersion is undesirable in view of dimensional accuracy and conductivity. The carbonaceous material content is more preferably in a range of about 5 to 35 parts by weight.

The carbonaceous materials (c), that is, the graphite, carbon black and the fine carbon fibers, will now be described in more detail.

Any type of graphite powder may be used in the invention. Artificial graphite powder and natural graphite powder are preferably used. Preferably, the graphite powder has a purity of at least about 95% and an average diameter of about 10 μm or less. When the purity is at least about 95%, the graphite powder contains reduced amounts of metal salts. This is advantageous for stable operation of fuel cells. When the average diameter is not more than about 10 μm, the graphitized meso-carbon microbeads and the graphite powder can be uniformly blended, resulting in improved conductivity. The lower limit of the average diameter of the graphite powder is not specified in the invention.

When the artificial graphite powder is used, for example, graphite powder which is formed by a heat treatment of amorphous carbon at about 2,500° C. to 4,000° C. is preferably used. This graphite powder is obtained as flakes. On the other hand, the natural graphite powder is flaky and is more graphitized compared to the artificial graphite powder.

The carbon black used in the invention is not limited. Preferably, the carbon black has a purity of at least about 95% and an average diameter of not more than about 100 nm. When the purity is at least about 95%, the carbon black contains reduced amounts of metal salts, and this is advantageous for stable operation of fuel cells. When the average diameter is not more than about 100 nm, the graphitized meso-carbon microbeads and the carbon black can be uniformly blended, resulting in improved conductivity. The lower limit of the average diameter of the carbon black is not specified in the invention.

The fine carbon fibers preferably used in the invention are generally referred to as "carbon nanofibers." Preferably, the carbon nanofibers have an average length of not more than about 500 μm and an average diameter of not more than about 2 μm. More preferably, the carbon nanofibers have an average length of not more than about 500 μm and an average diameter of not more than about 500 nm. The lower limit of the average diameter of the carbon nanofibers is not specified in the invention. The carbon nanofibers preferably have a purity of at least about 95% to ensure high conductivity of the fuel cell separator.

The carbon nanofibers are produced by a vapor deposition process and has a diameter and a length which are significantly smaller than those of general carbon fiber. The carbon nanofibers are, therefore, called "vapor-deposition carbon fibers". The degree of graphitization of the fine carbon fibers, such as the carbon nanofibers, changes due to a heating treatment at an elevated temperature. In the present invention, the fine carbon fiber is preferably treated at an elevated temperature to enhance the degree of graphitization and the conductivity.

The average diameter of the fine carbon fibers in the invention is defined as a sum of diameters of individual fibers divided by the number of the fibers when the fine carbon fibers have a circular cross is section, or as a sum of equivalent circle diameters of individual fibers divided by the number of the fibers when the fine carbon fibers do not have a circular cross-section.

When general carbon fibers other than the fine carbon fibers are used in the invention, the graphitized meso-carbon microbeads and the carbon fiber are insufficiently dispersed. Thus, the molded article contains voids, resulting in decreased gas impermeability.

The fuel cell separator of the invention may contain other additives, such as antioxidants, to improve thermal resistance and durability. For example, any antioxidant used in plastic materials may be used.

A method for making the fuel cell separator will now be described.

The method for making a fuel cell separator of the present invention comprises mixing:

(a) about 100 parts by weight of graphitized meso-carbon microbeads, (b) about 10 to 35 parts by weight of one of a thermosetting resin and a thermoplastic resin, and (c) about 1 to 40 parts by weight of at least one carbonaceous material selected from the group consisting of graphite powder, carbon black and fine carbon fibers, and molding the mixture under pressure at an elevated temperature.

The molding method of the fuel cell separator of the present invention is not limited and is appropriately determined according to the type of the resin used, as described below.

(Molding When Thermoplastic Resin is Used)

When a thermoplastic resin is used as the resin, for example, compression molding or injection molding may be employed. Injection molding is preferable in view of productivity, whereas compression molding requires a cooling time before removing the molded article from the mold.

In the injection molding, the predetermined amounts of the graphitized meso-carbon microbeads, the thermoplastic resin, and the carbonaceous material are mixed and fed into an injection machine under high pressure at an elevated temperature to form the fuel cell separator. Preferably, these components are mixed at a temperature which is several tens of degrees higher than the melting point when the thermoplastic resin is crystalline or the softening point when the thermoplastic resin is amorphous, and then injected into the mold.

In compression molding, the mixture is supplied to a mold and compressed at an elevated temperature to form a fuel cell separator. The temperature of the mold is several tens of degrees higher than the melting point or the softening point of the crystalline resin or the amorphous resin, respectively, although the temperature depends on the type of resin used.

(Molding when Thermosetting Resin is used)

The thermosetting resin may also be used instead of the thermoplastic resin. The thermosetting resin is cured by the heat in the molding process and is present as a cured resin in the fuel cell separator. Molding may be performed, for example, by compression or injection.

In compression molding, the predetermined amounts of the graphitized meso-carbon microbeads, the thermosetting resin, the carbonaceous material are mixed, fed into a compression mold, and compressed therein under high pressure at an elevated temperature to cure the thermosetting resin and form the fuel cell separator. In the mixing step, a solvent may be added, if necessary, to improve processability. Alternatively, the mixture may be heated prior to molding to pre-cure the thermosetting resin to adjust the flowability of the mixture. The compression molding is preferably performed at a mold temperature of about 130 to 220° C. and a molding pressure of about 196 to 1,470 N/cm$^2$, according to the type of the thermosetting resin used.

In injection molding, the mixture of the graphitized meso-carbon microbeads, the thermoplastic resin, and the carbonaceous material is fed into an injection machine to form the fuel cell separator. Preferably, these components are mixed using a mixer prior to the injection molding to obtain a uniformly dispersed mixture.

In injection molding, it is preferable that these components are mixed at a temperature of about 100 to 140° C. and that the mold is heated to a temperature in a range of about 40 to 200° C.

The fuel cell of the present invention will now be described.

The fuel cell of the present invention preferably includes a plurality of stacked unit cells separated by fuel cell separators, and each unit cell is composed of an air electrode (cathode), an electrolyte, and a fuel electrode (anode).

In the above-mentioned solid polymer electrolyte of the invention used as the electrolyte of the unit cell, hydrogen ions (protons) can selectively move in the solid polymer. A preferable example of such a solid polymer electrolyte is a perfluorocarbon sulfonic acid ion-exchange film. Any other solid polymer electrolyte may also be used in the invention.

As described above, the fuel cell separator of the invention exhibits superior gas impermeability, low electrical resistivity, and low volume resistivity. Moreover, the grooves for gas channels provided on both faces of the fuel cell separator have high dimensional accuracy. The gas flow rate is uniform in a fuel cell using this fuel cell separator, and the fuel cell has high generation efficiency.

Since the fuel cell separator does not require graphitizing, this can be produced using a simplified facility which saves energy and has a high productivity.

EXAMPLES

The invention will now be described in more detail with reference to the following Examples.

(1) Raw Materials

Graphitized meso-carbon microbeads were prepared by heating tar pitch having a softening point of 100° C. at 250° C. for 1 hour, filtrating the resulting meso-carbon microbeads, and then heating the residue to 3,000° C. The graphitized meso-carbon microbeads had an average diameter of 15 μm.

Carbonized meso-carbon microbeads were prepared by heating tar pitch having a softening point of 100° C. at 250° C. for 1 hour, filtrating the resulting meso-carbon microbeads, and then heating the residue to 1,000° C. The carbonized meso-carbon microbeads had an average diameter of 20 μm.

Thermosetting resin. Phenol resins a and b shown in Table 1 were used.

Thermoplastic resin. The following thermoplastic resins A to I were used.

A: Polyamide resin (nylon 6)

B: Polyester resin (polyethylene terephthalate)

C: Polycarbonate resin

D: Polyphenylene sulfide resin

E: Liquid crystal resin (aromatic polyester)

F: Fluorinated resin (polyvinylidene fluoride)

G: Polypropylene resin

H: Polystyrene resin (amorphous)

I: Polystyrene resin (crystalline)

Artificial graphite powder SP-10 (trade name) made by Nihon Kokuen Ltd. was used. The average grain diameter was 10 μm.

Natural graphite powder having an average grain diameter of 7 μm was used.

The carbon black used had an average diameter of 25 nm.

The fine carbon fibers used were the following vapor-deposition carbon fibers (hereinafter referred to as carbon nanofibers) which were treated at a temperature of 2,900° C. Grasker GHW made by Nikkiso Co., Ltd. Average diameter: 300 nm, average fiber length: 10 μm.

TABLE 1

| Thermosetting Resin | |
|---|---|
| Type | Remarks |
| a Phenol resin | Trade name: Sumiliteresin PR-50273 made by Sumitomo Durez Co., Ltd. |
| b Phenol resin | Trade name: Bellpearl S890 made by Kanebo, Ltd. |

TABLE 2

| Type of thermoplastic resin | | | | Melting point (° C.) | Softening point (° C.) | Remarks |
|---|---|---|---|---|---|---|
| A | Polyamide | Nylon 6 | Crystalline | 220 | — | Trade name: Leona, Asahi Chemical Industry, Ltd. |
| B | Polyester | Polyethylene terephthalate | Crystalline | 250 | — | Trade name: Rynite, Dupont |
| C | Polycarbonate | | Amorphous | — | 150 | Trade name: Apec HT, Bayer AG |
| D | Polyphenylene sulfide | | Crystalline | 290 | — | Trade name: Fortron, Polyplastics Co., Ltd. |
| E | Liquid crystal resin | Aromatic polyester | Crystalline | 210 | — | Trade name: Roderun, Unitika Ltd. |
| F | Fluorinated resin | Polyvinylidene fluoride | Crystalline | 275 | — | Trade name: Econol, Sumitomo Chemical Co., Ltd. |
| G | Polypropylene | | Crystalline | 160 | — | Trade name: Noprene, Sumitomo Chemical Co., Ltd. |
| H | Polystyrene | | Amorphous | — | 96 | Trade name: HIPS, Japan Polystyrene Inc. |
| I | Polystyrene | | Crystalline | 270 | — | Trade name: XAREC, Idemitsu Petrochemical Co., Ltd. |

(2) Test Methods (2-1) Melting Point and Softening Point of Thermoplastic Resin

The melting point was measured according to Japanese Industrial Standard (JIS) K 7121-1987 "Measurement of Transition Temperatures of Plastic".

The softening point was measured according to Japanese Industrial Standard (JIS) K 7206-1991 "Measurement of Vicat Softening Temperatures of Thermoplastic Resin".

(2-2) Average Diameters of Graphitized Meso-Carbon Microbeads, Carbonized Meso-Carbon Microbeads, and Graphite Powder were defined as a 50% accumulated average diameter which was measured by a laser diffraction particle size distribution measuring apparatus.

(2-3) Average Diameter (d50) of Carbon Black was defined as a 50% average diameter of a predetermined number of particles which were determined by image analysis of an electron micrograph.

(2-4) Characteristics (Bulk Density, Electrical Resistivity, Volume Resistivity, Gas Permeability, Bending Strength) of Carbonaceous Molded Article (Thin Plate)

Bulk density was defined by weight of the carbonaceous material divided by the volume of the carbonaceous molded article.

Electrical Resistivity was measured according to Japanese Industrial Standard (JIS) K 7197 using an electrical resistivity meter (trade name: Roresta, made by Mitsubishi Chemical Corporation).

Figure 2:
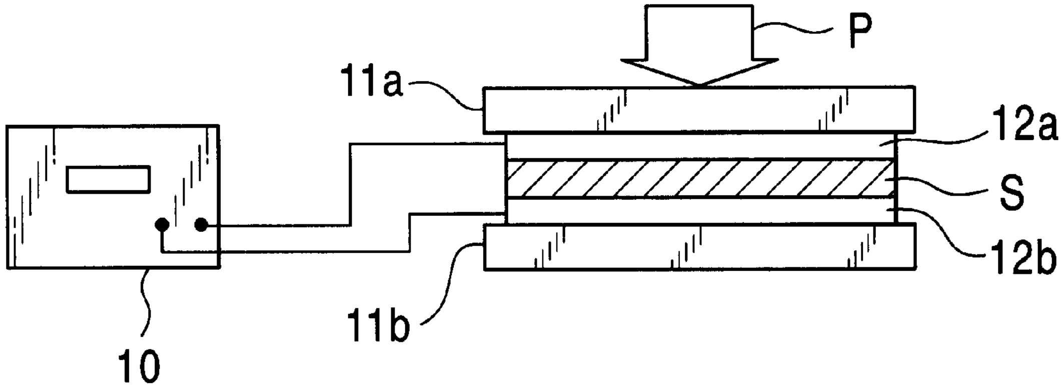
FIG. 2 is a schematic illustration of a method for measuring volume resistivity.

Volume Resistivity was determined based on the equation (1):

$$\text{Volume Resistivity}=(\text{volume resistance}/\text{thickness of sample})\times(\text{surface area of the sample}) \quad (1)$$

wherein the volume resistance was measured using an apparatus shown in FIG. 2 and the surface area of the sample was 25 $cm^2$.

In FIG. 2, reference numeral 10 represents an ohmmeter, reference numerals 11*a* and 11*b* represent insulating materials of polytetrafluoroethylene (PTFE), reference numerals 12*a* and 12*b* represent steel plates, the letter P indicates applied pressure (9.8×1000 N), and the letter S indicates a sample (50 mm square).

Gas permeability was determined by the volume of nitrogen which passed through a thin carbonaceous molded article when 0.098 MPa (gauge pressure: 1 $kg/cm^2\cdot G$) of nitrogen was supplied from one side of the article using a gas permeation measuring apparatus.

Bending strength was determined by a three-point bending method using an autographic machine made by Shimadzu Corporation.

(2-5) The root-mean-square error e of the depth of grooves on the carbonaceous molded article (fuel cell separator) was determined based on the equation (2):

$$\varepsilon = \pm\sqrt{\left(\sum_{i=1}^{n} di^2\right)\Big/ n(n-1)} \ \text{[mm]} \quad (2)$$

wherein di (mm) was a difference between the observed depth of i-th points in grooves and the number-average depth of 20 points in total in the grooves, and the fuel cell separator with grooves had a thickness of 2 mm, a width of 200 mm, a length of 200 mm, and each groove had a width of 1 mm and a depth of approximately 0.8 mm.

Examples 1 to 8 and Comparative Examples 1 to 7

Graphitized meso-carbon microbeads, carbonized meso-carbon microbeads, thermosetting resins, artificial graphite powder, natural graphite powder, carbon black, and carbon nanofibers as fine carbon fibers were thoroughly mixed according to the formulations shown in Table 3 using methanol as a solvent, and the uniform mixture was applied onto a releasing sheet and allowed to stand over night.

The dried coating was heated to 100° C. for 90 minutes to precure the thermosetting resins. The resulting bulk mixture was pulverized and the powder fed into a mold and compressed under the conditions shown in Table 3 to prepare carbonaceous molded articles (thin plates) having a thickness of 2 mm, a width of 200 mm, and a length of 200 mm.

The bulk density, electrical resistivity, volume resistivity, gas permeability, and bending strength of each carbonaceous molded article were measured. The results are shown in Table 4.

Using a mold having continuous projections corresponding to grooves of a separator, grooved carbonaceous articles (grooved fuel cell separators, hereinafter referred to as "grooved separators") having a thickness of 2 mm, a width of 200 mm, and a length of 200 mm were produced by the above conditions. The width of each groove (gas channel) was 1 mm and the depth was 0.8 mm.

The root-mean-square error e of the depth of grooves on surfaces of the grooved separator was measured. The results are shown in Table 4.

Examples 9 to 18 and Comparative Examples 1 to 9

Using thermoplastic resins instead of the thermosetting resins, mixtures shown in Table 5 were prepared as in Examples 1 to 8 and Comparative Examples 1 to 9, and then subjected to injection molding under the conditions shown in Table 5 to form carbonaceous molded articles (thin films) having a thickness of 2 mm, a width of 200 mm, and a length of 200 mm.

Grooved separators were also formed and subjected to evaluation as in Examples 1 to 8 and Comparative Examples 1 to 9. The results are shown in Table 6.

As shown in Tables 4 and 6, the fuel cell separator of the invention exhibits superior gas impermeability, low electrical resistivity, low volume resistivity, and superior dimensional accuracy of the grooves for gas channels.

The fuel cell separator of the invention can be produced without graphitization using a simplified facility. Thus, the method for making the fuel cell separator of the invention is advantageous in energy consumption and productivity.

An air electrode and a fuel electrode was provided on one face and the other face, respectively, of a solid polymer electrolyte plate composed of a perfluorocarbon sulfonic acid ion-exchange film to form a unit cell. A plurality of unit cells were stacked with the grooved separators therebetween to form a solid polymer-type fuel cell.

The solid polymer-type fuel cell was evaluated. In the grooved separators of Examples 1 to 18, the gas flow rate is uniform, and the fuel cell exhibits superior generation efficiency.

TABLE 3

| | Type of | Contents (parts by weight) | | | | | | Compression Molding Conditions | |
|---|---|---|---|---|---|---|---|---|---|
| | thermo-setting resin[1] | Thermo-setting resin[2] | Graphitized meso-carbon microbeads | Artificial graphite powder | Natural graphite powder | Carbon black | Carbon nano-fibers | Mold temperature[4] (° C.) | Pressure ($N/cm^2$) |
| Ex. 1 | a | 22 | 100 | 16 | 0 | 0 | 0 | 160 | 980 |
| Ex. 2 | a | 26 | 100 | 0 | 20 | 0 | 0 | 160 | 980 |
| Ex. 3 | a | 23 | 100[3] | 0 | 0 | 7 | 0 | 160 | 980 |
| Ex. 4 | b | 28 | 100 | 6 | 10 | 0 | 0 | 200 | 980 |
| Ex. 5 | a | 20 | 100[3] | 0 | 0 | 8 | 0 | 160 | 980 |
| Ex. 6 | a | 25 | 100 | 0 | 0 | 0 | 30 | 160 | 980 |
| Ex. 7 | a | 35 | 100[3] | 10 | 0 | 0 | 20 | 160 | 980 |
| Ex. 8 | a | 30 | 100 | 0 | 0 | 0 | 30 | 160 | 980 |

Note:
1) The letters in Table 3 correspond to those in Table 1.
2) The content (parts by weight) represents the content of the thermosetting resin after molding.
3) Average diameter of graphitized meso-carbon microbeads: 10 μm, average diameter of graphitized meso-carbon microbeads other than Ex. 3, 5 and 7: 15 μm.
4) Mold temperature during molding.

| | Type of | Contents (parts by weight) | | | | | | | Compression Molding Conditions | |
|---|---|---|---|---|---|---|---|---|---|---|
| | thermo-setting resin[1] | Thermo-setting resin[2] | Graphitized meso-carbon microbeads | Carbonized meso-carbon microbeads | Artificial graphite powder | Natural graphite powder | Carbon black | Carbon nano-fibers | Mold temperature[4] (° C.) | Pressure ($N/cm^2$) |
| Com. Ex. 1 | a | 33 | 100 | 0 | 0 | 0 | 0 | 0 | 160 | 980 |
| Com. Ex. 2 | b | 43 | 100 | 0 | 0 | 0 | 0 | 0 | 200 | 980 |
| Com. Ex. 3 | a | 18 | 0 | 100[4] | 0 | 0 | 0 | 0 | 160 | 980 |
| Com. Ex. 4 | a | 25 | 50[3] | 50 | 0 | 0 | 0 | 0 | 160 | 980 |
| Com. Ex. 5 | a | 7 | 100 | 0 | 0 | 0 | 0 | 0 | 160 | 980 |
| Com. Ex. 6 | a | 186 | 100 | 0 | 0 | 0 | 0 | 0 | 160 | 980 |
| Com. Ex. 7 | a | 33 | 0 | 0 | 100 | 0 | 0 | 0 | 160 | 980 |

Note:
1) Symbols in Table 3 correspond to those in Table 1.
2) The content (parts by weight) represents the content of the thermosetting resin after molding.
3) Average diameter of graphitized meso-carbon microbeads: 10 μm, average diameter of graphitized meso-carbon microbeads other than Comparative Example 4: 15 μm.
4) Average diameter of carbonized meso-carbon microbeads: 25 μm, average diameter of carbonized meso-carbon microbeads other than Comparative Example 3: 20 μm.
5) Mold temperature during molding.

TABLE 4

| | Carbonaceous Molded Article | | | | | Grooved separator |
|---|---|---|---|---|---|---|
| | Bulk Density ($g/cm^3$) | Specific Resistance ($m\Omega \cdot cm$) | Volume Resistivity ($m\Omega \cdot cm$) | Gas Permeability ($cm^3/min \cdot cm^2$) | Bending strength ($N/cm^2$) | Root-mean-square error $\epsilon$ of groove depth [$\times 10^2$] (mm) |
| Example 1 | 1.97 | 9.2 | 12.1 | $<1 \times 10^{-4}$ | 7120 | ±4.2 |
| Example 2 | 1.94 | 9.6 | 13.2 | $<1 \times 10^{-4}$ | 7190 | ±4.1 |
| Example 3 | 1.93 | 9.8 | 13.0 | $<1 \times 10^{-4}$ | 7240 | ±4.2 |
| Example 4 | 1.97 | 10.1 | 13.3 | $<1 \times 10^{-4}$ | 7420 | ±3.4 |
| Example 5 | 1.98 | 8.8 | 9.2 | $<1 \times 10^{-4}$ | 7250 | ±4.4 |
| Example 6 | 1.98 | 6.4 | 8.8 | $<1 \times 10^{-4}$ | 7260 | ±4.6 |
| Example 7 | 1.98 | 6.8 | 9.0 | $<1 \times 10^{-4}$ | 7080 | ±4.4 |
| Example 8 | 1.96 | 7.2 | 7.8 | $<1 \times 10^{-4}$ | 7840 | ±3.9 |
| Comparative Example 1 | 1.98 | 26.2 | 42.2 | $<1 \times 10^{-4}$ | 8036 | ±3.4 |
| Comparative Example 2 | 1.93 | 98.1 | 160.4 | $<1 \times 10^{-4}$ | 8330 | ±2.2 |
| Comparative Example 3 | 1.87 | 120.1 | 198.0 | $<1 \times 10^{-4}$ | 7644 | ±3.8 |
| Comparative Example 4 | 1.98 | 96.3 | 156.2 | $<1 \times 10^{-4}$ | 7742 | ±3.6 |
| Comparative Example 5 | 1.42 | 130.4 | 290.0 | $1.2 \times 10^{-2}$ | 392 | ±15 |
| Comparative Example 6 | 1.60 | 350.2 | 514.8 | $<1 \times 10^{-4}$ | 9016 | ±3.0 |
| Comparative Example 7 | 1.99 | 12.4 | 24.6 | $<1 \times 10^{-4}$ | 3430 | ±10 |

TABLE 5

| | Type of | Contents (parts by weight) | | | | | | Injection Molding conditions[4)] | |
|---|---|---|---|---|---|---|---|---|---|
| | thermo-plastic resin[1)] | Thermo-plastic resin[2)] | Graphitized meso-carbon microbeads | Artificial graphite powder | Natural graphite powder | Carbon black | Carbon nano-fibers | Cylinder temperature (° C.) | Mold temperature (° C.) |
| Ex. 9 | A | 30 | 100 | 15 | 0 | 0 | 0 | 250 | 80 |
| Ex. 10 | B | 30 | 100 | 0 | 25 | 0 | 0 | 270 | 70 |
| Ex. 11 | C | 30 | 100[3)] | 0 | 0 | 7 | 0 | 270 | 80 |
| Ex. 12 | D | 20 | 100[3)] | 0 | 0 | 0 | 12 | 250 | 80 |
| Ex. 13 | E | 30 | 100 | 10 | 0 | 0 | 15 | 250 | 80 |
| Ex. 14 | F | 27 | 100 | 0 | 0 | 0 | 20 | 380 | 120 |
| Ex. 15 | A | 30 | 100[3)] | 0 | 0 | 35 | 0 | 250 | 80 |
| Ex. 15 | G | 20 | 100 | 5 | 0 | 15 | 0 | 250 | 80 |
| Ex. 15 | H | 27 | 100 | 0 | 5 | 0 | 0 | 250 | 80 |
| Ex. 16 | I | 32 | 100 | 0 | 0 | 10 | 0 | 250 | 80 |

Note:
[1)]Symbols in Table 5 correspond to those in Table 2.
[2)]The content (parts by weight) represents the content of the thermoplastic resin after molding.
[3)]Average diameter of graphitized meso-carbon microbeads: 10 $\mu$m, average diameter of graphitized meso-carbon microbeads other than Examples 11, 12, and 15: 15 $\mu$m.
[4)]Injection pressure: 490 $N/cm^2$, locking force: $1{,}470 \times 10^3$ to $1{,}960 \times 10^3$ N.

TABLE 5-continued

| | Type of thermoplastic resin[1) | Contents (parts by weight): Thermoplastic resin[2) | Graphitized meso-carbon microbeads | Carbonized meso-carbon microbeads | Artificial graphite powder | Natural graphite powder | Carbon black | Carbon nano-fibers | Injection molding conditions[5): Cylinder temperature (° C.) | Mold temperature (° C.) |
|---|---|---|---|---|---|---|---|---|---|---|
| Com. Ex. 8 | A | 54 | 100 | 0 | 0 | 0 | 0 | 0 | 250 | 80 |
| Com. Ex. 9 | B | 54 | 100[3) | 0 | 0 | 0 | 0 | 0 | 270 | 70 |
| Com. Ex. 10 | C | 54 | 0 | 100[4) | 0 | 0 | 0 | 0 | 270 | 80 |
| Com. Ex. 11 | D | 54 | 0 | 100 | 0 | 0 | 0 | 0 | 320 | 130 |
| Com. Ex. 12 | E | 54 | 50 | 50 | 0 | 0 | 0 | 0 | 380 | 120 |
| Com. Ex. 13 | F | 54 | 50[3) | 50[4) | 0 | 0 | 0 | 0 | 340 | 150 |
| Com. Ex. 14 | A | 5 | 100 | 0 | 0 | 0 | 0 | 0 | 250 | 80 |
| Com. Ex. 15 | A | 233 | 100[3) | 0 | 0 | 0 | 0 | 0 | 250 | 80 |
| Com. Ex. 16 | A | 33 | 0 | 0 | 100 | 0 | 0 | 0 | 250 | 80 |

Note:
1)Symbols in Table 5 correspond to those in Table 2.
2)The content (parts by weight) represents the content of the thermoplastic resin after molding.
3)Average diameter of graphitized meso-carbon microbeads: 10 μm, average diameter of graphitized meso-carbon microbeads other than Comparative Examples 9, 13, and 15: 15 μm.
4)Average diameter of carbonized meso-carbon microbeads: 25 μm, average diameter of carbonized meso-carbon microbeads other than Comparative Examples 10 and 13: 20 μm.
5)Injection pressure: 490 N/cm$^2$, locking force: 1,470 × $10^3$ to 1,960 × $10^3$ N.

TABLE 6

| | Carbonaceous Molded Article: Bulk Density (g/cm$^3$) | Specific Resistance (mΩ · cm) | Volume Resistivity (mΩ · cm) | Gas Permeability (cm$^3$/min · cm$^2$) | Bending strength (N/cm$^2$) | Grooved separator: Root-mean-square error ε of groove depth [×$10^2$] (mm) |
|---|---|---|---|---|---|---|
| Example 9 | 1.98 | 10.2 | 13.9 | <1 × $10^{-4}$ | 6620 | ±3.2 |
| Example 10 | 2.02 | 9.1 | 12.8 | <1 × $10^{-4}$ | 6620 | ±4.4 |
| Example 11 | 1.99 | 8.2 | 14.2 | <1 × $10^{-4}$ | 6664 | ±4.0 |
| Example 12 | 1.98 | 8.4 | 10.2 | <1 × $10^{-4}$ | 5960 | ±4.2 |
| Example 13 | 1.96 | 12.6 | 10.2 | <1 × $10^{-4}$ | 6260 | ±4.4 |
| Example 14 | 1.99 | 6.0 | 10.2 | <1 × $10^{-4}$ | 6760 | ±4.8 |
| Example 15 | 1.98 | 6.2 | 9.6 | <1 × $10^{-4}$ | 6080 | ±4.8 |
| Example 16 | 1.96 | 7.8 | 10.1 | <1 × $10^{-4}$ | 5860 | ±4.6 |
| Example 17 | 1.92 | 10.6 | 13.6 | <1 × $10^{-4}$ | 6340 | ±3.6 |
| Example 18 | 1.91 | 10.6 | 14.0 | <1 × $10^{-4}$ | 6600 | ±4.2 |
| Comparative Example 8 | 1.89 | 35 | 112.4 | <1 × $10^{-4}$ | 9310 | ±2.8 |
| Comparative Example 9 | 1.91 | 34 | 119.6 | <1 × $10^{-4}$ | 8134 | ±3.8 |
| Comparative Example 10 | 1.81 | 118 | 347.2 | <1 × $10^{-4}$ | 7056 | ±3.9 |
| Comparative Example 11 | 1.83 | 120 | 328.1 | <1 × $10^{-4}$ | 9408 | ±4.5 |
| Comparative Example 12 | 1.88 | 95 | 261.3 | <1 × $10^{-4}$ | 9702 | ±2.7 |
| Comparative Example 13 | 2.01 | 98 | 288.2 | <1 × $10^{-4}$ | 3210 | ±4.2 |
| Comparative Example 14 | 1.35 | 364 | 78.2 | 2.6 × $10^{-2}$ | 294 | ±15 |
| Comparative Example 15 | 1.58 | 388 | 628.8 | <1 × $10^{-4}$ | 1029 | ±2.2 |
| Comparative Example 16 | 1.99 | 12 | 19.2 | <1 × $10^{-4}$ | 7742 | ±20 |

What is claimed is:

1. A fuel cell separator comprising:

(a) about 100 parts by weight of graphitized meso-carbon microbeads;

(b) about 10 to 35 parts by weight of one of a thermosetting resin and a thermoplastic resin; and (c) about 1 to 40 parts by weight of at least one carbonaceous material selected from the group consisting of artificial graphite powder, natural graphite powder, carbon black and fine carbon fiber, wherein said separator is substantially gas impermeable.

2. A fuel cell separator according to claim 1, wherein the fine carbon fiber has an average diameter of not more than about 2 μm and an average length of not more than about 500 μm.

3. A fuel cell separator according to claim 2, wherein the graphitized meso-carbon microbeads have an average diameter of not more than about 50 μm, and said carbonaceous material includes carbon black and at least one member selected from the group consisting of artificial graphite powder and natural graphite powder, wherein the carbon black has an average diameter of not more than about 100 nm and the artificial graphite powder or the natural graphite powder has an average diameter of not more than about 10 μm.

4. A fuel cell comprising a fuel cell separator according to claim 3.

5. A fuel cell comprising a fuel cell separator according to claim 2.

6. A fuel cell separator according to claim 1, wherein the graphitized meso-carbon microbeads have an average diameter of not more than about 50 μm, and said carbonaceous material includes carbon black and at least one member selected from the group consisting of artificial graphite powder and natural graphite powder, wherein the carbon black has an average diameter of not more than about 100 nm, and the artificial graphite powder or the natural graphite powder has an average diameter of not more than about 10 μm.

7. A fuel cell comprising a fuel cell separator according to claim 6.

8. A fuel cell separator according to claim 1, wherein the thermoplastic resin is an amorphous thermoplastic resin having a softening point of at least about 150° C.

9. A fuel cell separator according to claim 1, wherein the thermoplastic resin is an amorphous thermoplastic resin having a softening point of at least about 90° C.

10. A fuel cell separator according to claim 1, wherein the thermoplastic resin is selected from the group consisting of polypropylene, polystyrene, polyamides, polyesters, polycarbonates, polyphenylene sulfides, liquid crystal resins, and fluorinated resins.

11. A fuel cell separator according to claim 1, wherein the thermosetting resin is selected from the group consisting of phenol resins, furan resins, epoxy resins, unsaturated polyester resins, and polyimide resins.

12. A fuel cell separator according to claim 1, further comprising a multiplicity of grooves in at least one surface thereof and wherein the separator has a root-mean-square error of the depth of the grooves of $\pm 5\times10^{-2}$ mm.

13. A fuel cell separator according to claim 1, wherein said carbonaceous material includes carbon black and at least one member selected from the group consisting of artificial graphite powder and natural graphite powder, wherein the carbon black, the artificial graphite powder and the natural graphite powder have a purity of at least about 95%.

14. A fuel cell comprising a fuel cell separator according to claim 1.

15. A method for making a fuel cell separator comprising:

1) mixing
   - (a) about 100 parts by weight of graphitized meso-carbon microbeads,
   - (b) about 10 to 35 parts by weight of one of a thermosetting resin and a thermoplastic resin, and
   - (c) about 1 to 40 parts by weight.of at least one carbonaceous material selected from the group consisting of artificial graphite powder, natural graphite powder, carbon black and fine carbon fiber; and
2) molding the resulting mixture under pressure at an elevated temperature;

wherein said separator is substantially gas impermeable.

16. A method according to claim 15, wherein the molding is injection molding and the elevated temperature is about 40–200° C.

17. A method according to claim 15, wherein the molding is compression molding, the elevated temperature is about 130-220° C. and the pressure is about 196 to 1470 $N/cm^2$.

18. A method according to claim 15, wherein the molding is compression molding and a solvent is mixed into the resulting mixture.

19. A method according to claim 15, further comprising pre-curing the thermosetting resin by heating the resulting mixture prior to molding.

* * * * *

UNITED STATES PATENT AND TRADEMARK OFFICE

CERTIFICATE OF CORRECTION

PATENT NO. : 6,544,680 B1
DATED : April 8, 2003
INVENTOR(S) : Takano et al.

It is certified that error appears in the above-identified patent and that said Letters Patent is hereby corrected as shown below:

Column 17,
Line 2, please change "an amorphous" to -- a crystalline --; and
Line 3, please change "softening" to -- melting --.

Signed and Sealed this

Twenty-fourth Day of February, 2004

JON W. DUDAS
*Acting Director of the United States Patent and Trademark Office*